United States Patent
Zellner, Jr. et al.

(10) Patent No.: US 9,036,857 B2
(45) Date of Patent: May 19, 2015

(54) GARNISH DOUBLE RING FOR SPEAKER SEAL

(75) Inventors: Kerry Scott Zellner, Jr., Saline, MI (US); Benjamin Warren Penner, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 360 days.

(21) Appl. No.: 13/433,728

(22) Filed: Mar. 29, 2012

(65) Prior Publication Data

US 2013/0255067 A1 Oct. 3, 2013

(51) Int. Cl.
| | |
|---|---|
| *H04R 1/02* | (2006.01) |
| *H01S 4/00* | (2006.01) |
| *H05K 5/00* | (2006.01) |
| *B60R 11/02* | (2006.01) |
| *B60R 11/00* | (2006.01) |
| *B60R 13/02* | (2006.01) |

(52) U.S. Cl.
CPC ........... *H04R 1/025* (2013.01); *Y10T 29/49002* (2013.01); *H04R 2499/13* (2013.01); *B60R 11/0217* (2013.01); *B60R 2011/0005* (2013.01); *B60R 2013/0287* (2013.01)

(58) Field of Classification Search
CPC ......... H01G 7/023; B41J 2/395; H03F 13/00; H04R 1/025
USPC ............................ 29/592.1; 381/389; 181/150
See application file for complete search history.

(56) References Cited

U.S. PATENT DOCUMENTS

| | | | | |
|---|---|---|---|---|
| 5,048,089 | A | * | 9/1991 | Moore ............................. 381/87 |
| 5,414,229 | A | * | 5/1995 | Rocheleau et al. ............ 181/150 |
| 6,258,438 | B1 | * | 7/2001 | Loveland et al. .............. 428/137 |
| 6,456,722 | B1 | * | 9/2002 | Davey et al. ................... 381/389 |
| 6,707,925 | B1 | * | 3/2004 | Breithaupt ..................... 381/386 |
| 6,987,860 | B2 | * | 1/2006 | Kurihara et al. ............... 381/386 |
| 7,177,438 | B2 | * | 2/2007 | Iwaya et al. ................... 381/389 |
| 7,298,653 | B1 | * | 11/2007 | Hopper et al. ............ 365/185.28 |
| 7,298,863 | B2 | | 11/2007 | Kirihara et al. |
| 7,364,009 | B2 | * | 4/2008 | Sperle et al. ................... 181/150 |
| 7,543,681 | B2 | * | 6/2009 | Howard et al. ................ 181/150 |
| 7,940,948 | B2 | * | 5/2011 | Campbell, Jr. ................. 381/386 |

* cited by examiner

*Primary Examiner* — David Angwin
(74) *Attorney, Agent, or Firm* — Gifford, Krass, Sprinkle, Anderson & Citkowski, P.C.

(57) ABSTRACT

An adaptive speaker panel is provided. The speaker panel can have a speaker opening and a pair of concentric sealing ribs proximate to the speaker opening, the pair of sealing ribs having a first sealing rib and a second sealing rib towards a center of the speaker opening from the first sealing rib. The first sealing rib is first sealing rib dimensioned to seal against a first speaker basket and the second sealing rib dimensioned to seal against a second speaker basket that is smaller than the first speaker basket. Also, the first sealing rib and the second sealing rib are operatively arranged such that without modification to the speaker panel the first speaker basket or the second speaker basket can be attached to and sealed against the panel.

14 Claims, 2 Drawing Sheets

GARNISH DOUBLE RING FOR SPEAKER SEAL

FIELD OF THE INVENTION

The present invention is related to a speaker panel and, in particular, an adaptive speaker panel having a garnish double ring that can seal against two different sized speakers.

BACKGROUND OF THE INVENTION

The use of audio speakers in motor vehicles, home stereo systems, and the like is known. Such speakers are typically mounted to a speaker panel with a speaker basket sealed up against the speaker panel in order to provide an acoustic seal therebetween. Naturally, the speaker panel has an opening therewithin such that vibration of a speaker diaphragm can transmit sound waves therethrough.

In addition to the above, heretofore speaker panels have been known to have a sealing ring or rib extending therefrom that can seal against the basket frame of a speaker attached to the panel. However, in the event that a different sized speaker is desired to be employed, a different and separate speaker panel has been required, or in the alternative, modification of the speaker panel has been required. Therefore, a speaker panel that can provide an acoustic seal to at least two different sized speakers, i.e. two speakers that have a different size from each other, without modification to the panel would be desirable.

SUMMARY OF THE INVENTION

An adaptive speaker panel is provided. The speaker panel can have a speaker opening and a pair of concentric sealing ribs proximate to the speaker opening, the pair of sealing ribs having a first sealing rib and a second sealing rib spaced inwardly from the first sealing rib. The first and second sealing ribs are arranged such that without modification to the speaker panel, a speaker basket can seal against the first sealing rib if the basket is too large to seal against the second sealing rib, or in the alternative, the speaker basket can seal against the second sealing rib if the basket is too small to seal against the first sealing rib.

The pair of concentric sealing ribs can extend from an exterior side of the speaker panel and the first sealing rib can have or extend a first height from the speaker panel and the second sealing rib can extend a second height from the panel. In some instances, the first height is larger than the second height. The speaker panel can have a grill extending across the speaker opening and the pair of concentric sealing ribs can be a pair of cylindrically shaped concentric sealing ribs.

A process for using a double sealing ring speaker panel to mount different sized speakers to the panel without modification thereof is also provided. The process includes providing a speaker panel with a speaker opening, the panel also having a first sealing rib that extends from the speaker panel proximate to the speaker opening and having a first rib dimension. The panel also has a second sealing rib that extends from the speaker panel proximate the speaker opening and nested within the first sealing rib, the second sealing rib having a second rib dimension that is smaller than the first rib diameter. In some instances, the first and second rib dimensions are first and second rib diameters, respectively, however this is not required.

A first speaker having a first speaker basket dimensioned to seal against the first sealing rib and a second speaker having a second speaker basket dimensioned to seal against the second sealing rib are also provided. The second speaker basket is smaller than the first speaker basket and is too small to seal against the first sealing rib. The first speaker or the second speaker is determined or selected to be installed or attached to the speaker panel and the selected speaker is attached to the speaker panel without modification thereof using the first sealing rib or the second sealing rib depending upon which speaker is selected. In this manner, a single speaker panel can be used, for example in a motor vehicle, home stereo system, etc., even though different sized speakers are used during the assembly thereof.

DETAILED DESCRIPTION OF THE PRESENT INVENTION

The present invention provides an adaptive speaker panel that can selectively have two different sized speakers attached thereto without modifications to the speaker panel being required. As such, the present invention has utility or use as a component for a sound system.

The adaptive speaker panel can have a speaker opening with a pair of concentric sealing ribs proximate to the opening. The pair of concentric sealing ribs can have a first sealing rib and a second sealing rib spaced inwardly from the first sealing rib. In addition, the first sealing rib and the second sealing rib are arranged such that without modification to the speaker panel, a first speaker can be acoustically sealed against the first sealing rib if it is too large to seal against the second sealing rib, or in the alternative, a second speaker can be sealed against the second sealing rib if the speaker is too small to seal against the first sealing rib.

The pair of concentric sealing ribs can extend from an under, exterior or back side of the speaker panel and may or may not have the same height. Stated differently, in some instances the first sealing rib extends from the exterior side of the speaker panel a greater amount or a greater height than the second sealing rib and may or may not be used to assist in the installation of the second speaker within the first sealing rib. In addition, the pair of sealing ribs afford for a single speaker panel can be used, for example in a plurality of motor vehicles being assembled along an assembly line, even though different sized speakers are selectively installed among the plurality of motor vehicles. For example and for illustrative purposes only, if a given motor vehicle unit requires a standard or smaller speaker, such a speaker can be installed and be acoustically sealed up against the inner sealing rib. In addition, if an alternate or subsequent motor vehicle unit requires a larger speaker, then such a speaker can be installed and acoustically sealed against the outer sealing rib. In this manner, a single speaker panel can be used for different motor vehicle units, different motor vehicle models, different motor vehicle acoustic packages, and the like.

Figure 1:
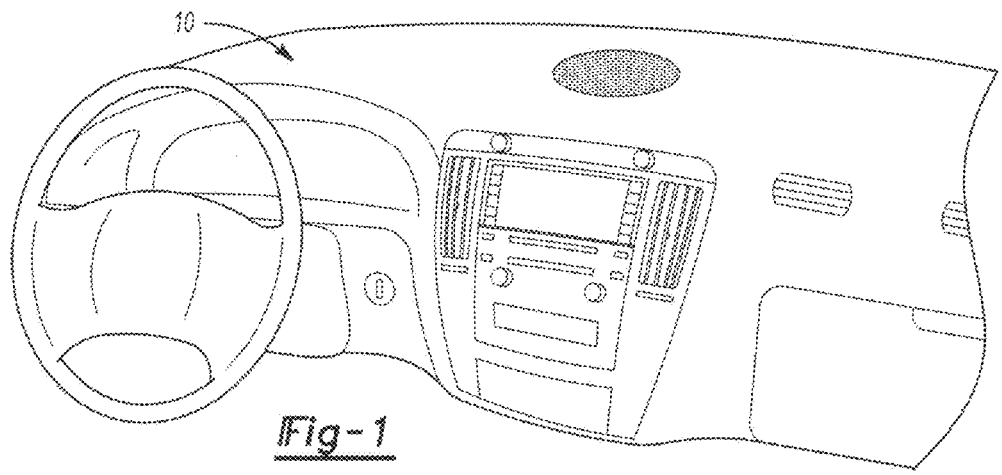
FIG. 1 is a perspective view of a motor vehicle instrument panel having a speaker panel according to an embodiment of the present invention.

Turning now to FIG. 1, a perspective view of an instrument panel for a motor vehicle that also serves as a speaker panel 10 is shown. The instrument panel has a speaker opening 105 through which a speaker can transmit audio signals or sound waves as is known to one skilled in the art.

Figure 2:
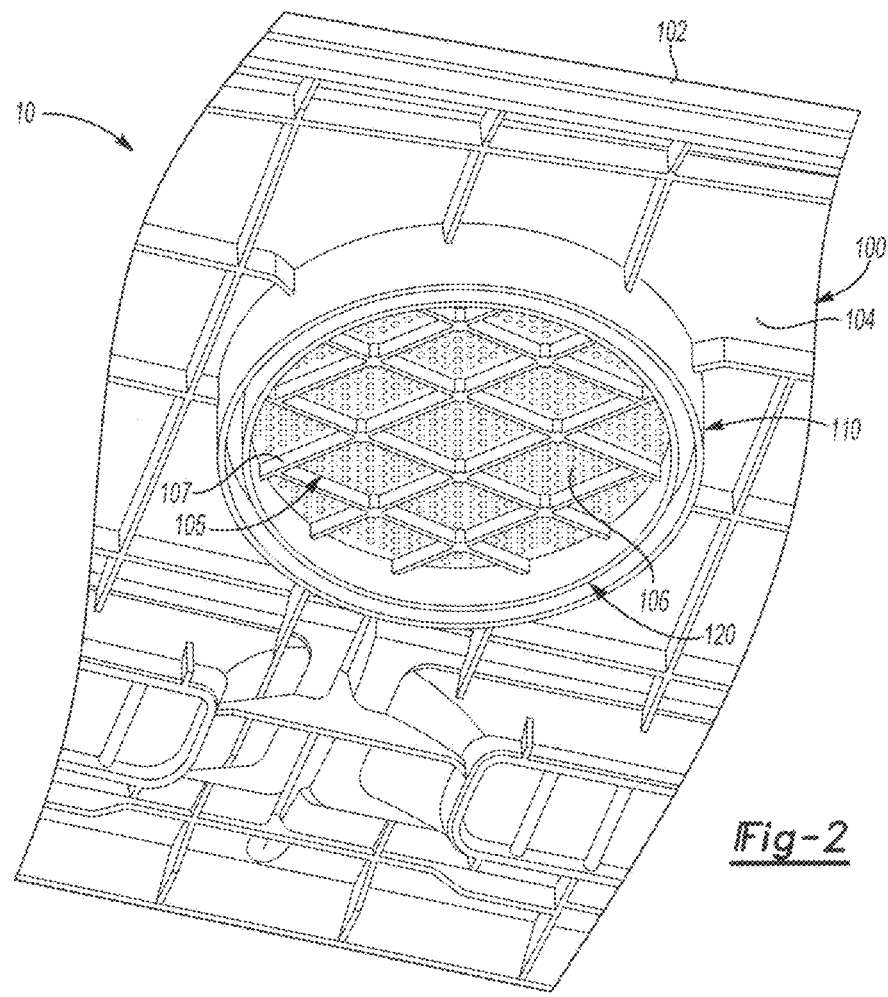
FIG. 2 is a perspective view of an under or exterior side of the embodiment shown in FIG. 1.
Figure 3:
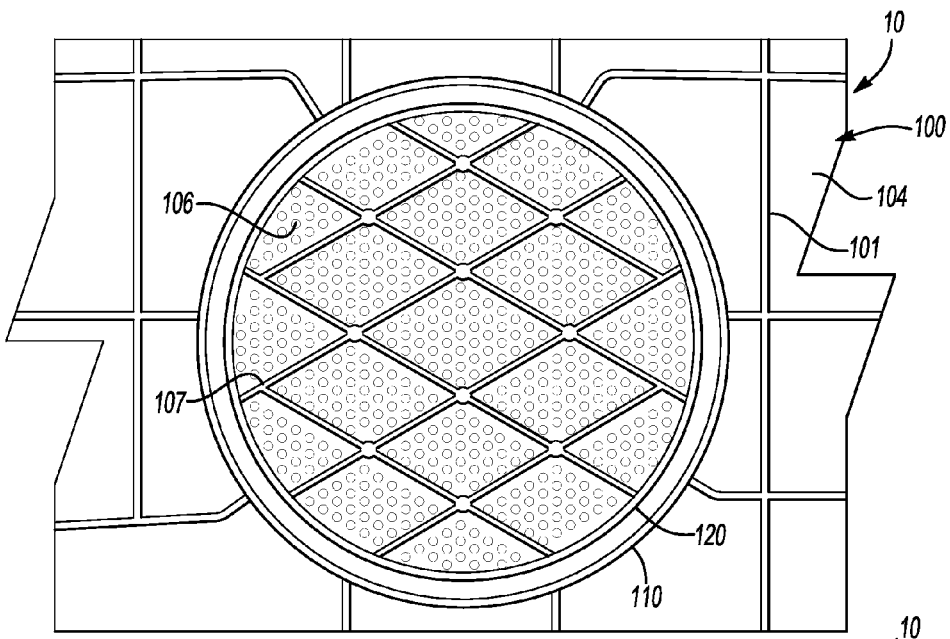
FIG. 3 is a plan view of the embodiment shown in FIG. 2.

FIGS. 2 and 3 show a back side of the speaker panel 10 which can include a panel 100, the panel 100 having an upper, front or interior side 102 and a lower, back or exterior side 104. Extending from the back side 104 can be a first sealing rib 110 and a second sealing rib 120. The second sealing rib 120 can be spaced inwardly to and/or nested within the first sealing rib 110 such that a pair of concentric sealing ribs are afforded. It is appreciated that the first rib 110 and the second rib 120 are proximate to and may or may not bound a speaker opening 105 and the speaker opening 105 can have a speaker grill 106 with supports 107 extending there across in order to hide and/or protect a speaker attached to the back side 104.

Figure 4:
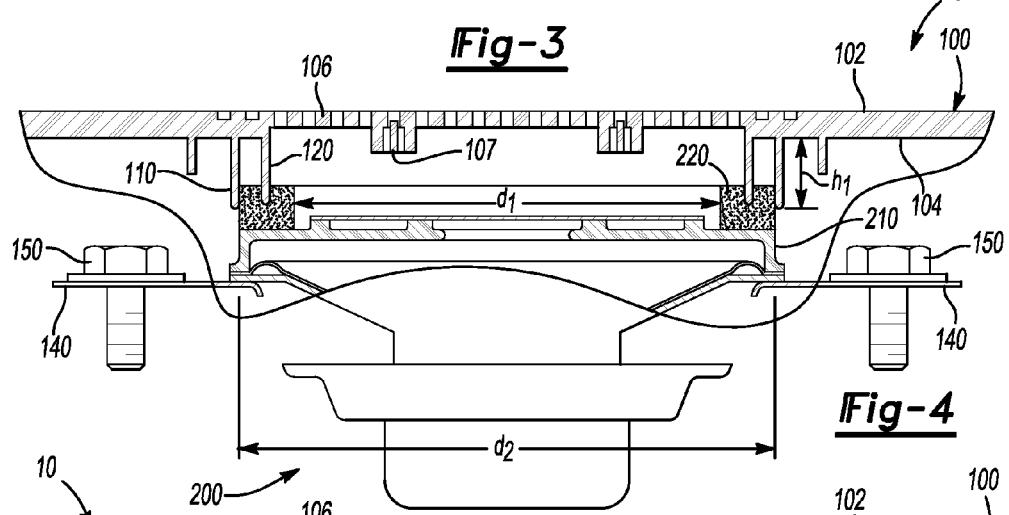
FIG. 4 is a side cross-sectional view of the embodiment shown in FIG. 3 with a smaller sized speaker attached to the speaker panel.
Figure 5:
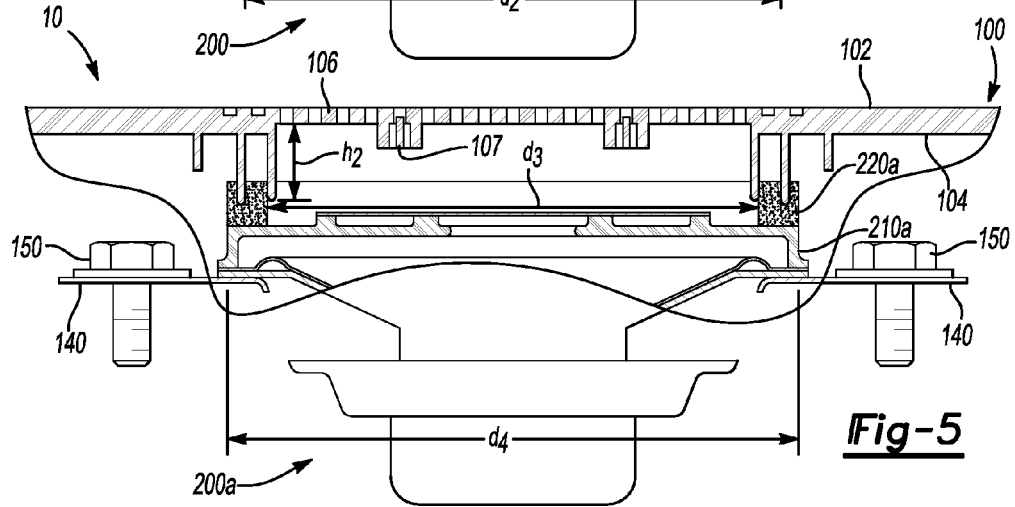
FIG. 5 is a side cross-sectional view of the embodiment shown in FIG. 3 with a larger sized speaker attached to the speaker panel.

FIGS. 4 and 5 show a side cross-sectional view of the speaker panel 100 and the speaker opening 105. As shown in these figures, the first sealing rib 110 is proximate to the speaker opening 105 and extends from the back side 104 a predetermined height $h_1$. Spaced inwardly from the first sealing rib 110 is the second sealing rib 120 which can bound the speaker opening 105 and extend from the back side 104 a predetermined height $h_2$. In some instances, the second sealing rib 120 extends a lesser height than the first sealing rib 110.

Also shown in FIG. 4 is a speaker 200 attached to the back side 104 of the speaker panel 100 through the use of a threaded fastener 150 and a flange 140. As shown in the figure, the speaker 200 has a speaker basket 210 which may or may not have an elastomeric cushion 220 that has an inner dimension $d_1$ and an outer dimension $d_2$. In the event that the speaker 200 is circular in shape, the inner dimension $d_1$ can be an inner diameter and the outer dimension $d_2$ can be an outer diameter. However, it is not required that the speaker opening 105; the pair of scaling ribs 110, 120; and/or the speaker 200 be circular or cylindrical in shape.

As shown by the inner dimension $d_1$ and the outer dimension $d_2$, the elastomeric cushion 220 is not dimensioned to fit and/or seal against the first sealing rib 110, however it does fit and/or seal against the second sealing rib 120.

Turning now to FIG. 5, the same speaker panel 100 is shown, however a second speaker 200a is attached to the back side 104 using the same threaded fastener 150 and flange 140. In addition, the second speaker 200a has a speaker basket 210a that may or may not have an elastomeric cushion piece 220a that has an inner dimension $d_3$ and an outer dimension $d_4$. As shown in the figure, the dimensions of the elastomeric cushion 220a are such that it is too large to fit and/or seal against the second sealing rib 120 but it does fit and/or seal against the first sealing rib 110. In this manner, a single speaker panel 100 can accommodate two different sized speakers without modification to the panel 100.

It is appreciated that a speaker panel such as the one disclosed herein can reduce the total number of components that must be manufactured and supplied for one or more motor vehicle styles, models, and the like being assembled on one or more assembly lines. Therefore, greater efficiency, reduced inventory, and the like can be provided by the inventive adaptive speaker panel.

It is appreciated that the above embodiments are for illustrative purposes only. As such, adjustments, modifications, and the like to the one or more embodiments described herein will be obvious to one skilled in the art and thus fall within the scope of the invention. For example, the speaker panel can be made from any material known to those skilled in the art including plastics, metals alloys, ceramics, wood and the like. As such, the scope of the invention is determined by the claims and all equivalents thereof.

What is claimed is:

1. An adaptive speaker panel for a motor vehicle comprising:
    a panel with a speaker opening and a pair of concentric sealing ribs proximate said speaker opening, said pair of concentric sealing ribs having a first sealing rib and a second sealing rib spaced inwardly towards a center of said speaker opening from said first sealing rib, said first sealing rib dimensioned to seal against a first speaker basket and said second sealing rib dimensioned to seal against a second speaker basket that is smaller than the first speaker basket;
    said first sealing rib and said second sealing rib operatively arranged such that without modification to said panel the first speaker basket or the second speaker basket can be attached to and sealed against said panel such that there is contact along a periphery of said first sealing rib and the first speaker basket and said second sealing rib and the second speaker basket.

2. The adaptive speaker panel of claim 1, wherein said pair of concentric sealing ribs extend from an exterior side of said speaker panel.

3. The adaptive speaker panel of claim 2, wherein said first sealing rib extends from said exterior side a first height and said second sealing rib extends from said exterior side a second height.

4. The adaptive speaker panel of claim 3, wherein said first height is less than said second height.

5. The adaptive speaker panel of claim 4, wherein said speaker panel has a grill extending across said speaker opening.

6. The adaptive speaker panel of claim 1, wherein said pair of concentric sealing ribs is a pair of cylindrically shaped concentric sealing ribs.

7. A speaker panel for mounting a speaker within a motor vehicle, the speaker panel comprising:
    a panel having a speaker opening;
    a first sealing rib extending from said panel proximate said speaker opening and dimensioned to seal against a first speaker basket; and
    a second sealing rib extending from said panel proximate said speaker opening and nested within said first sealing rib towards a center of said speaker opening, said second sealing rib dimensioned to seal against a second speaker basket that is smaller than the first speaker basket;
    said first sealing rib and said second sealing rib operatively arranged such that the first speaker basket or the second speaker basket can be attached to and sealed against said panel such that there is contact along a periphery of said first sealing rib and the first speaker basket and said second sealing rib and the second speaker basket without modifying said panel.

8. The speaker panel of claim 7, wherein said first sealing rib and said second sealing rib are a pair of concentric sealing ribs.

9. The speaker panel of claim 8, wherein said pair of concentric sealing ribs is a pair of cylindrically shaped concentric sealing ribs.

10. The speaker panel of claim 8, wherein said panel is a generally planar panel having an exterior side and an interior side, said first sealing rib and said second sealing rib extending from said exterior side of said panel.

11. The speaker panel of claim 10, wherein said second sealing rib bounds said speaker opening.

12. The speaker panel of claim 11, wherein said first sealing rib extends from said panel a first height and said second sealing rib extends from said panel a second height.

13. The speaker panel of claim 12, wherein said first height is less than said second height.

14. The speaker panel of claim 13, wherein said panel has a grill extending across said speaker opening.

\* \* \* \* \*